Figure 1:
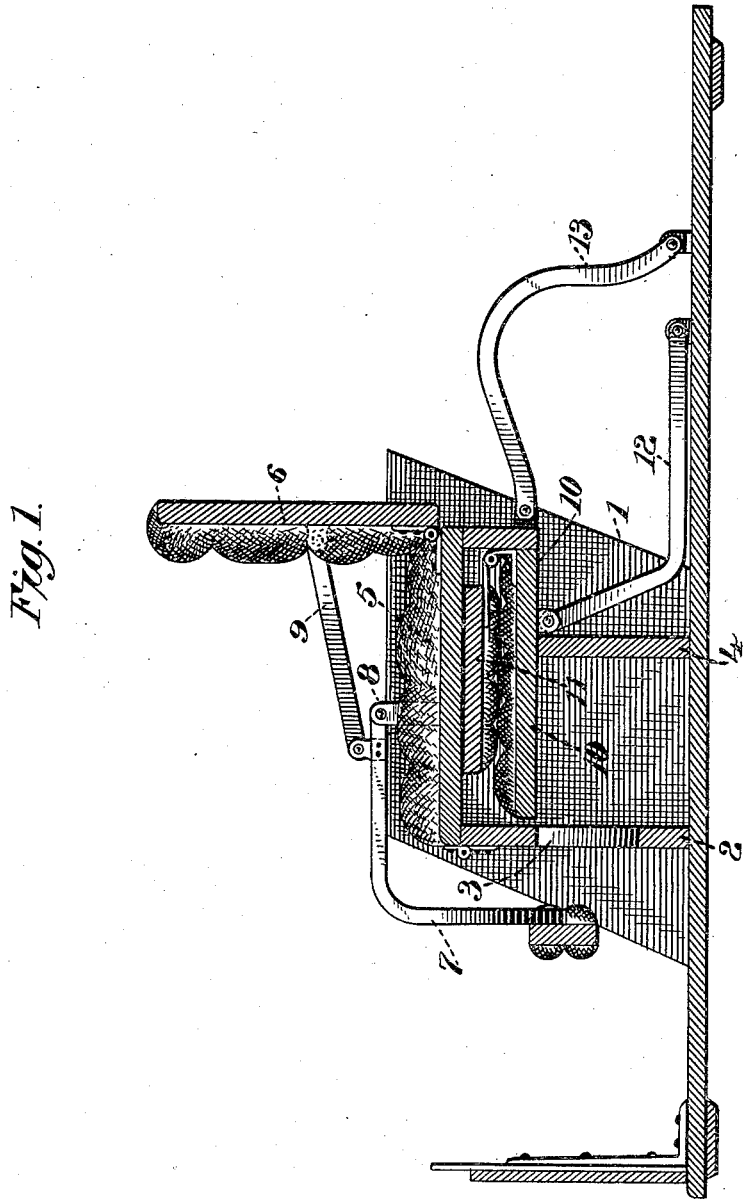

(No Model.) 3 Sheets—Sheet 1.
G. W. KERR.
VEHICLE SEAT.

No. 415,971. Patented Nov. 26, 1889.

Witnesses
Wm. J. Tanner
A. J. Tanner

Inventor
George W. Kerr
by his attorney
D. H. Hubbard (No Model.)

G. W. KERR.
VEHICLE SEAT.

No. 415,971.　　　　　　　　Patented Nov. 26, 1889.

3 Sheets—Sheet 2.

Witnesses
Wm. J. Tanner
A. J. Tanner

Inventor
George W. Kerr
by his attorney
S. H. Hubbard

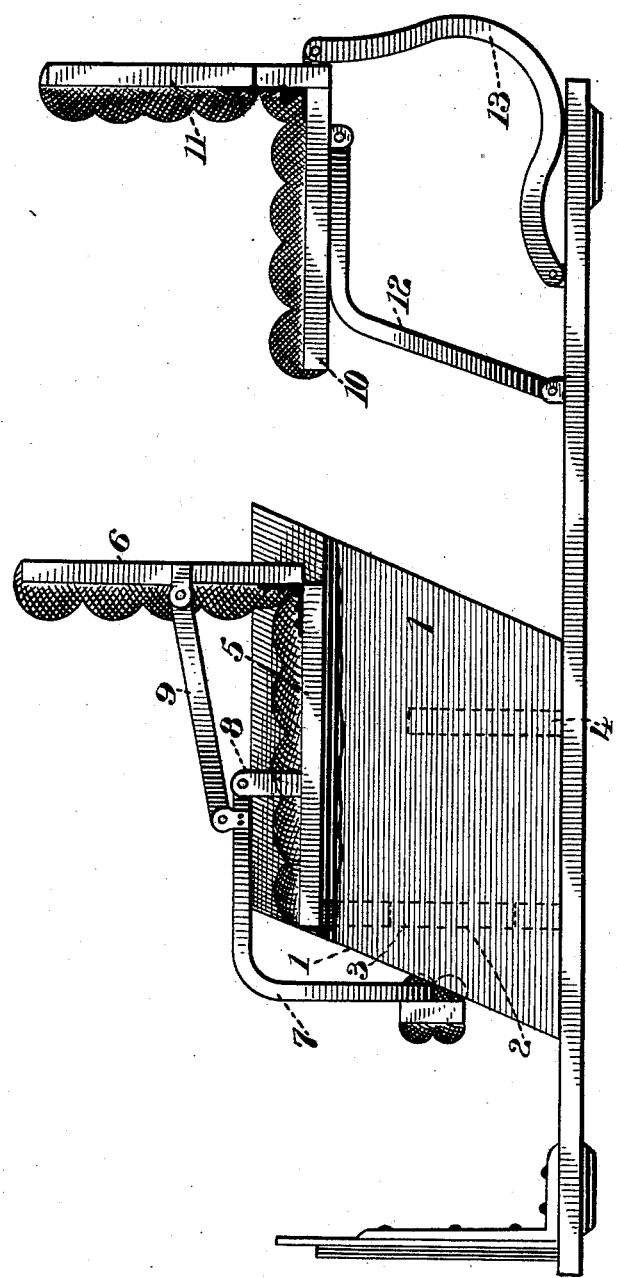

UNITED STATES PATENT OFFICE.

GEORGE W. KERR, OF NEW HAVEN, CONNECTICUT.

VEHICLE-SEAT.

SPECIFICATION forming part of Letters Patent No. 415,971, dated November 26, 1889.

Application filed August 26, 1889. Serial No. 322,044. (No model.)

*To all whom it may concern:*

Be it known that I, GEORGE W. KERR, a citizen of the United States, residing at New Haven, in the county of New Haven and State of Connecticut, have invented certain new and useful Improvements in Vehicle-Seats; and I do hereby declare the following to be a full, clear, and exact description of the invention, such as will enable others skilled in the art to which it appertains to make and use the same.

My invention relates to certain new and useful improvements in jump-seat vehicles, and has for its object to provide a seat arrangement so constructed that the carriage to which it is applied may be quickly and easily arranged either as a single carriage for the seating of two persons, as a vehicle of the kind known as "dos-a-dos," in which the persons of the back seat face the rear of the vehicle, or as an ordinary two-seated carriage with both seats facing the front; and with these ends in view my invention consists in the construction and combination of elements hereinafter fully set forth, and then recited in the claims.

In order that those skilled in the art to which my invention appertains may fully understand its construction and operation, I will describe the same in detail, reference being had to the accompanying drawings, which form a part of this specification, and in which—

Figure 1 is a longitudinal section showing the arrangement as a single carriage; Fig. 2, a side elevation, partially broken away, showing the dos-a-dos arrangement; Fig. 3, a similar view, but with the jump-seat in position as the rear seat.

Like numerals denote the same parts in all the figures of the drawings.

The seat-box of the vehicle consists of the sides 1, between which in front is secured a transverse vertical partition 2, to which the hinged front seat is secured, and which preferably has an opening 3, to afford access to the chambered interior of the box, in which robes or similar articles may be stored.

4 is another transverse partition, serving to inclose the rear of the box, and also as a partial support for the jump-seat when in its forward and folded position.

The forward seat 5, which, as above set forth, is hinged to the partition 2, is suitably cushioned, and has hinged at its rear edge a cushioned back 6.

7 is a lazy-back, pivoted at its ends to ears 8 on the respective sides of the seat, and 9 are connecting-arms pivoted as to one end to the hinged back and as to the other end to the lazy-back just above its pivotal point.

The jump-seat consists of a cushioned seat 10, having a hinged back 11 secured thereon. Pivotally attached to the under side of the seat are a pair of obtuse-angle braces 12, whose other ends are pivotally attached to the body or the plank which in a buckboard stands in place thereof. 13 are other braces curvilinear in form, and whose ends are pivoted to the rear of the jump-seat just below the folding back. These braces are preferably arranged one pair of each to the seat, and either near the edges of said seat or with the rear braces placed a little within the line of the forward braces. A single rear brace will answer, however, if placed centrally of the seat.

In the operation of my improvement the single-seated vehicle (shown at Fig. 1) may be altered to the dos-a-dos by simply raising the lazy-back to its vertical position, which movement, by means of the connecting-arms, carries the hinged back rearward and downward on its hinge until it rests upon the rear brace of the folded jump-seat, as shown at Fig. 2, the lazy-back then standing vertically between the two seats and forming a back for each of them.

In order to utilize the jump-seat, the lazy-back is folded down, as seen at Fig. 1, so that the dos-a-dos seat forms the front-seat back. Said front seat is then raised on its hinge-connection with the partition and the jump-seat, which has hitherto laid folded beneath the front seat, raised and carried backward upon its pivoted braces until it assumes the position shown at Fig. 3, with the curved braces supporting it at the rear and the obtusely-angled braces bearing along its bottom. The front seat is then returned to its normal position. It is to be observed that when the lazy-back is folded down in front it forms a lock against any accidental rearward movement of its back, the dos-a-dos seat. Furthermore, the jump-seat when folded and jumped forward is so divided at its back as to partially support the rear edge of the front seat, leaving no opening between said rear edge and the stationary portion of its back. (See Fig. 1.)

The jump-seat when in its forward and folded position is supported partly on the partition 4 and partly by the ends of the obtuse-angled braces, whose other ends lie in contact with the body or board.

The construction herein shown and described is exceedingly advantageous, since the change from one arrangement of seat to another is effected without any adjustment for removal of cushions or other parts of the vehicle, and, furthermore, the change from a single seat to a dos-a-dos may be made without raising the front seat on its hinges.

I claim—

1. In a jump-seat vehicle, the combination, with a front seat hinged at its forward edge, of the jump-seat having a hinged and folding back, and pivoted braces secured to said jump-seat, whereby it may be stowed beneath the front seat or may be supported on its braces as a rear seat, substantially as set forth.

2. In a jump-seat vehicle, the combination, with the rear seat, of a pair of curved braces pivoted at one end to the rear of the seat and at the other end to the body, and a pair of obtuse-angled braces pivoted at one end to the seat forward of the pivotal point of the curved braces and at the other end to the floor, both pairs of said braces adapted to cooperate in the support of the seat when in its rearward or open position, substantially as shown and set forth.

3. In a vehicle, the combination, with the front seat hinged at its forward edge, of the back 6, hinged to the rear edge of said front seat and adapted to be raised when said front seat is raised, and means, as described, for firmly supporting said back either in its vertical or horizontal position, substantially as set forth.

4. The combination, with the front seat hinged at its front edge, of the back 6, hinged to the rear edge of said front seat, the lazy-back, whose ends are pivoted at the sides of the front seat, and pivoted connections extended between said lazy-back and the sides of the hinged back 6, substantially as specified.

5. The combination, with the front seat, of the back hinged thereto, the lazy-back pivoted to said front seat and adapted to fold forward and downward in front of said seat, and connections extended between said lazy-back and the back 6, whereby the position of the latter is controlled, substantially as described.

6. The combination, with the front seat, of a back hinged thereto and adapted to be turned downward and rearward to form the dos-a-dos seat, and a lazy-back connected to the front seat and adapted to operate the back 6 to its vertical or its horizontal position, substantially as set forth 7. The combination, with the front seat hinged at its forward edge, of the back 6, hinged to the rear edge of said seat, means for operating said back either to a vertical position or to a horizontal position for use as a dos-a-dos seat, and braces for the support thereof when horizontally disposed, substantially as specified.

In testimony whereof I affix my signature in presence of two witnesses.

GEORGE W. KERR.

Witnesses:
S. H. HUBBARD,
WM. J. TANNER.